US008306661B2

(12) United States Patent
Ueyama (10) Patent No.: US 8,306,661 B2
(45) Date of Patent: Nov. 6, 2012

(54) METHOD AND SYSTEM FOR ESTABLISHING NO-ENTRY ZONE FOR ROBOT

(75) Inventor: Tsuyoshi Ueyama, Toyota (JP)

(73) Assignee: Denso Wave Incorporated, Tokyo (JP)

( * ) Notice: Subject to any disclaimer, the term of this patent is extended or adjusted under 35 U.S.C. 154(b) by 1247 days.

(21) Appl. No.: 12/078,930

(22) Filed: Apr. 8, 2008

(65) Prior Publication Data

US 2008/0249659 A1   Oct. 9, 2008

(30) Foreign Application Priority Data

Apr. 9, 2007   (JP) ................................ 2007-101663

(51) Int. Cl.
G05B 19/18       (2006.01)
G06F 17/00       (2006.01)
(52) U.S. Cl. ..................... 700/255; 348/94; 318/568.13; 382/154; 382/294; 700/259; 700/263; 901/2
(58) Field of Classification Search ...................... 901/30
See application file for complete search history.

(56) References Cited

U.S. PATENT DOCUMENTS 4,754,415 A * 6/1988 George et al. ................. 700/250
6,678,582 B2 * 1/2004 Waled ........................... 700/245
6,898,486 B2 * 5/2005 Watanabe et al. ............. 700/259
2007/0150093 A1 * 6/2007 Nagatsuka et al. ........... 700/235
2008/0188983 A1 * 8/2008 Ban et al. ...................... 700/245
2010/0017032 A1 * 1/2010 Dai et al. ....................... 700/251

FOREIGN PATENT DOCUMENTS

JP        B2-3343682      11/2002

* cited by examiner

Primary Examiner — Thomas G. Black
Assistant Examiner — Lin B Olsen
(74) Attorney, Agent, or Firm — Oliff & Berridge, PLC (57) ABSTRACT

In a system, a first closed region specifying unit specifies a first closed region on a screen for enclosing an imaged obstacle in a first image, and a first projection area determining unit determines a first virtual projection area by extending a first closed region in a first orientation. A second closed region specifying unit specifies a second closed region on the screen. The second closed region encloses the imaged obstacle in the second image. A second projection area determining unit determines a second virtual projection area by extending the second closed region in a second orientation. An establishing unit establishes an overlap region between the first and second projection areas as the no-entry zone for the robot.

8 Claims, 6 Drawing Sheets

METHOD AND SYSTEM FOR ESTABLISHING NO-ENTRY ZONE FOR ROBOT

CROSS REFERENCE TO RELATED APPLICATIONS

This application is based on Japanese Patent Application 2007-101663 filed on Apr. 9, 2007. This application claims the benefit of priority from the Japanese Patent Application, so that the descriptions of which are all incorporated herein by reference.

FIELD OF THE INVENTION

The present invention relates to methods and systems for establishing a no-entry zone for robots; this no-entry zone is located in a three-dimensional robot working space.

BACKGROUND OF THE INVENTION

In industrial robots, such as part mounting robots, part checking robots, and the like, a target position to which a tool, such as a hand, of an end of a robot should be moved is remotely taught by a teaching pendant to a controller for the robot before actual working of the robot.

In the target position teaching task, spaces in which obstacles, such as workpieces, tools, another machine, are located are taught by the teaching pendant to the controller as "no-entry zones". This results that the controller calculates a trajectory of movement of the tool toward the target position and from it so as to avoid the trajectory from entering the no-entry zones.

A first conventional method is to establish such no-entry zones on a computer using CAD (Computer Aided Design) data of the robot and that of each of the obstacles. The CAD data represents three-dimensional electronic design drawings.

However, the first conventional method requires the CAD data of the robot and that of an obstacle, and causes errors between the CAD data and the actual robot and obstacle; this may cause practical utilization of the first conventional method to be difficult.

A second conventional method is to measure, with an image sensor, such as a camera, a three-dimensional shape of an obstacle located in the three-dimensional robot working space. In a specific example of the three-dimensional measurement, Japanese Examined Patent Publication No. 3343682 discloses a method of:

picking up images of an obstacle located in the three-dimensional robot working space from different viewpoints with a stereo camera; and obtaining information indicative of the three-dimensional shape of the obstacle based on the picked-up images using stereoscopic principle.

However, the second conventional method requires complicated processes of the picked-up image data in order to obtain the information indicative of the three-dimensional shape of the obstacle; this may increase the amount of computation required to obtain the information indicative of the three-dimensional shape of the obstacle.

In addition, the second conventional method needs to:

specify, on the picked-up images, corresponding points therebetween, such as vertexes and/or edges, on the profile of the obstacle; and process the picked-up image data based on the specified corresponding points on the picked-up images to obtain the information indicative of the three-dimensional shape of the obstacle.

However, the second conventional method forces the operator to specify, on the picked-up images, the corresponding points therebetween; this may increase burden on the operator.

Particularly, some vertexes and/or some edges, which are required to obtain the information indicative of the three-dimensional shape of the obstacle, may disappear when the obstacle has a comparatively complicated shape. Similarly, some vertexes and/or some edges, which are required to obtain the information indicative of the three-dimensional shape of the obstacle, may disappear depending on the image picking-up directions.

Specifically, only two image pickups of the obstacle from the different viewpoints cannot obtain the information indicative of the three-dimensional shape of the obstacle.

SUMMARY OF THE INVENTION

In view of the background, an object of an aspect of the present invention is to provide methods and systems, which are capable of establishing a no-entry zone for a robot in a three-dimensional robot workspace without increasing at least one of complicated imaging processes and burden on an operator.

According to one aspect of the present invention, there is provided a system for establishing, in a three-dimensional working space for a robot, a space in which an obstacle occupies as no-entry zone for the robot. The system includes an image pickup unit. The image pickup unit is configured to pick up a first image of the obstacle from a first viewpoint with a first orientation with respect to the obstacle while a whole of the obstacle is within a predetermined first field of view. The image pickup unit is configured to pick up a second image of the obstacle from a second viewpoint with a second orientation with respect to the obstacle while the whole of the obstacle is within a predetermined second field of view. The second viewpoint and second orientation are different from the first viewpoint and first orientation, respectively. The system includes a display unit configured to display the picked-up first and second images on a screen thereof. The system includes a first closed region specifying unit configured to specify a first closed region on the screen. The first closed region encloses an imaged obstacle in the first image. The system includes a first projection area determining unit configured to determine a first virtual projection area by extending the first closed region in the first orientation. The system includes a second closed region specifying unit configured to specify a second closed region on the screen, the second closed region enclosing the imaged obstacle in the second image. The system includes a second projection area determining unit configured to determine a second virtual projection area by extending the second closed region in the second orientation. The system includes an establishing unit configured to establish an overlap region between the first and second projection areas as the no-entry zone for the robot.

According to another aspect of the present invention, there is provided a method of establishing, in a three-dimensional working spaces for a robot, a space in which an obstacle occupies as no-entry zone for the robot. The method includes picking up a first image of the obstacle from a first viewpoint with a first orientation with respect to the obstacle while a whole of the obstacle is within a predetermined first field of view. The method includes picking up a second image of the obstacle from a second viewpoint with a second orientation with respect to the obstacle while the whole of the obstacle is within a predetermined second field of view. The second viewpoint and second orientation are different from the first viewpoint and first orientation, respectively. The method includes displaying the picked-up first and second images on a screen of a display, and specifying a first closed region on the screen, the first closed region enclosing an imaged obstacle in the first image. The method includes determining a first virtual projection area by extending the first closed region in the first orientation, and specifying a second closed region on the screen, the second closed region enclosing the imaged obstacle in the second image. The method includes determining a second virtual projection area by extending the second closed region in the second orientation, and establishing an overlap region between the first and second projection areas as the no-entry zone for the robot.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

An embodiment of the present invention will be described hereinafter with reference to the FIGS. 1 to 5. In the embodiment, the present invention is applied to a visual-test robot system used to, for example, visually check whether parts, such as automobile parts, are properly assembled to workpieces.

Figure 1:
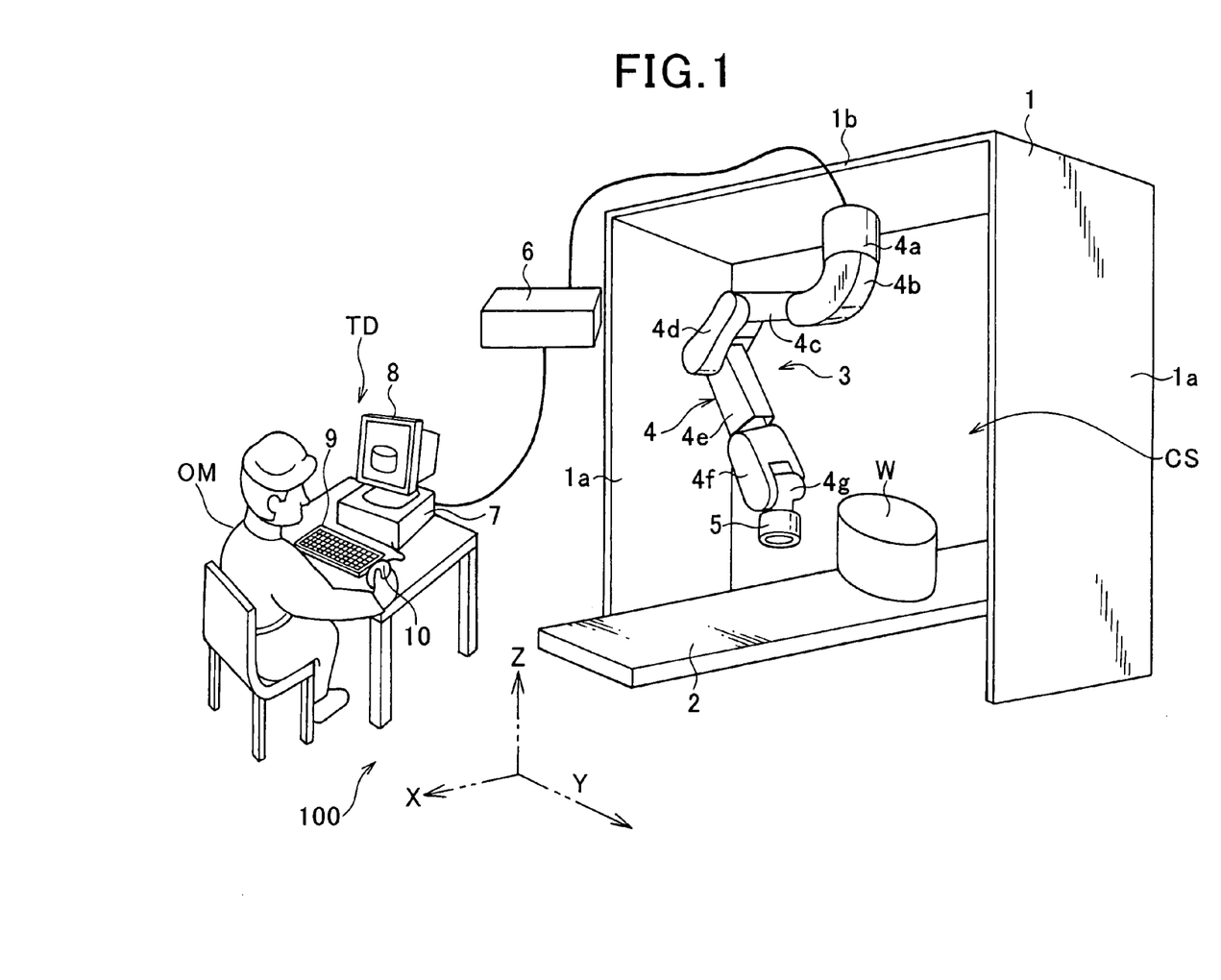
FIG. 1 is a perspective view schematically illustrating an example of the hardware configuration of a robot test system according to an embodiment of the present invention.

In the embodiment, referring to FIG. 1, there is illustrated the overall structure of a visual-test robot system 100 according to the embodiment.

In FIG. 1, reference character 1 represents a substantially U-shaped check gate installed in a factory. The check gate 1 consists of a pair of plate-like long sidewalls 1a parallely mounted on a floor of the factory, and a plate-like top wall 1b fixedly supported on top ends of the pair of long sidewalls 1a.

The U-shaped check gate 1 provides a predetermined three-dimensional check space CS among the top wall 1b and the pair of sidewalls 1a on the floor. For example, the check space CS serves as a robot working space in the embodiment.

For example, as illustrated in FIG. 1, when an X-Y plane is defined in the floor and a Z-axis is defined to be orthogonal to the X-Y plane, a three-dimensional coordinate system (X, Y, Z) is defined. The check space CS is included in the three-dimensional coordinate system (X, Y, Z).

Reference character 2 represents a conveyor mounted on the floor. The conveyor 2 is arranged to extend through the check space in parallel to the sidewalls 1a. The conveyor 2 works to transport workpieces W mounted thereon.

Specifically, the conveyor 2 works to transport workpieces W and to temporarily stop such that a workpiece W is located at a predetermined check position in the check space CS.

The visual robot test system 100 is equipped with a robot 3, a robot controller 6 for controlling the robot 3, and a teaching device TD for the robot controller 6. The robot 3 is communicably connected to the robot controller 6 through a cable or by radio, and the robot controller 6 is communicably connected to the teaching device TD through a cable or by radio. In the embodiment, as the robot 3, a vertical articulated robot is for instance used.

The robot 3 is mounted on, for example, an inner surface of the top wall 1b of the check gate 1 to be located in the check space CS and to be directed toward a workpiece W located at the check position in the check space CS.

The robot 3 consists of an articulated arm 4. The articulated arm 4 is provided with a substantially cylindrical-shaped base 4a mounted on the inner surface of the top wall 1b. The articulated arm 4 is provided with a bent shoulder joint 4b so mounted at its one end on the base 4a as to be horizontally rotatable on the base 4a about a center axis thereof. The other end of the bent shoulder joint 4b is formed as forked ends.

The articulated arm 4 is provided with a first arm joint 4c with one end inserted between the forked ends of the bent shoulder joint 4b and pivotally supported thereby in a vertical direction parallel to the Z-axis.

The articulated arm 4 is provided with a second arm joint 4d. The second arm member 4d is formed at both ends with forked portions. The other end of the first arm joint 4c is inserted between the one forked ends of the second arm joint 4d such that the second arm member 4d pivots in a direction parallel to an X-Y plane in the three-dimensional coordinate system (X, Y, Z).

The articulated arm 4 is provided with a third arm joint 4e with one end inserted between the other forked ends of the second arm joint 4d and pivotally supported thereby in a direction parallel to an X-Y plane in the three-dimensional coordinate system (X, Y, Z).

The articulated arm 4 is provided with a fourth arm joint 4f so mounted at its one end on the other end of the third arm joint 4e as to be rotatable about an axis parallel to a lengthy direction of the third arm joint 4e. The other end of the fourth arm joint 4f is formed as forked ends.

The articulated arm 4 is provided with a substantially cylindrical shaped wrist joint 4g. The wrist joint 4g is inserted between the forked ends of the fourth arm joint 4f and pivotally supported thereby about a center axial direction thereof.

The wrist joint 4g is formed with a grip portion projecting therefrom. On a tip end of the grip portion, an imaging device 5, such as a CCD (Charge Coupled Device) camera, is mounted.

The articulated arm 4 is also provided with a number of motors, such as DC serve motors, M as actuators.

Specifically, the base 4a is integrated with at least one of the motors M and a rotation transmission system (not shown) that transfers rotation of at least one of the motors M to the shoulder joint 4b to horizontally rotate it.

The shoulder joint 4b is integrated with at least one of the motors M and a rotation transmission system (not shown) that transfers rotation of at least one of the motors M to the first arm joint 4c to pivot it.

The first arm joint 4c is integrated with at least one of the motors M and a rotation transmission system (not shown) that transfers rotation of at least one of the motors M to the second arm joint 4d to pivot it.

The second arm joint 4d is integrated with at least one of the motors M and a rotation transmission system (not shown) that transfers rotation of at least one of the motors M to the third arm joint 4e to pivot it.

The third arm joint 4e is integrated with at least one of the motors M and a rotation transmission system (not shown) that transfers rotation of at least one of the motors M to the fourth arm joint 4f to swing it.

The fourth arm joint 4f is integrated with at least one of the motors M and a rotation transmission system (not shown) that transfers rotation of at least one of the motors M to the wrist joint 4g to rotate it.

Specifically, the base 4a, the shoulder joint 4b, the first to fourth arm joints 4c to 4f, and the wrist joint 4g of the articulated arm 4 serve as linkages (linkage mechanisms) of the robot 3.

Information indicative of dimensions of each of the linkages 4a to 4g, such as the length and shape thereof in its longitudinal or axial direction, is stored beforehand in, for example, a memory of the controller 6 described hereinafter.

Figure 2:
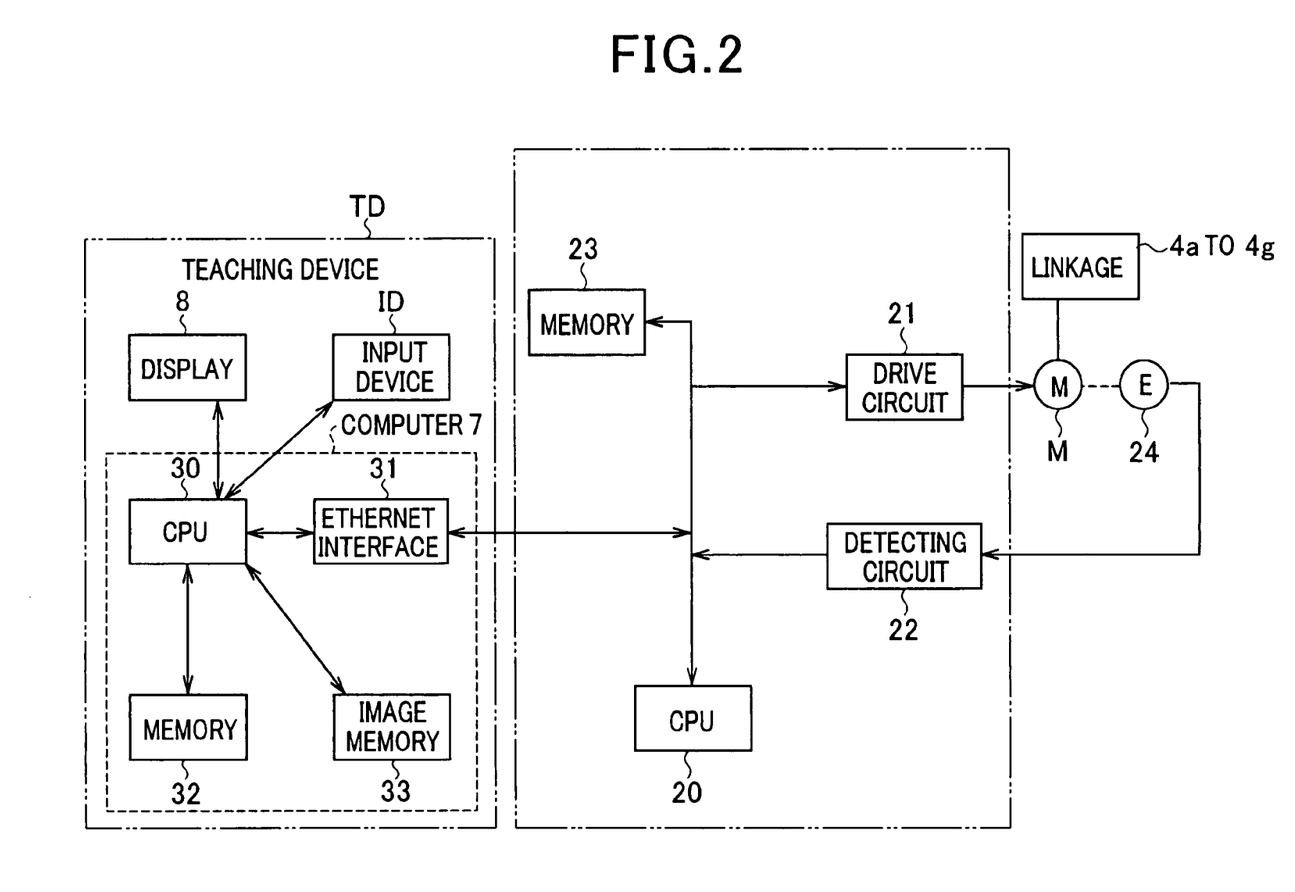
FIG. 2 is a block diagram schematically illustrating an example of the system configuration of the robot test system illustrated in FIG. 1.

As illustrated in FIG. 2, the controller 6 includes a CPU 20, drive circuits 21 for driving the motors M, a detecting circuit 22, and a memory 23. The elements 21 to 23 are electrically connected to the CPU 20.

The memory 23 has stored therein system programs that cause the CPU 20 to control the system resources of the robot 1. The memory 23 also has stored therein a check program for the robot 3.

Note that, in FIG. 2, the base 4a, the shoulder joint 4b, the first to fourth arm joints 4c to 4f, and the wrist joint 4g are collectively illustrated as a linkage by one block.

The motors M for driving the linkages (joint portions) 4a to 4g are collectively illustrated as one block to which reference character M is assigned.

The detecting circuit 22 is operative to detect an actual position and an actual angular velocity of each of the linkages 4a to 4g.

The robot 3 includes a rotary encoder 24 attached to, for example, the rotating shaft of each of the motors M, and electrically connected to the detecting circuit 22.

The rotary encoder 24 serves as a position sensor and a speed sensor. Specifically, the rotary encoder 24 is configured to output digital pulses that correspond to angular motion (revolution) of the rotating shaft of each of the motors M. The pulse signal consisting of the train of the digital pulses is given to the detecting circuit 22.

The detecting circuit 22 is operative to detect, based on the pulse signal sent from each of the rotary encoders 24, the actual position of the rotating shaft of each of the motors M, and therefore, the actual position of each of the linkages 4a to 4g.

In addition, the detecting circuit 22 is operative to:

count the number of the pulses in the pulse signal input from each of the rotary encoders 24 per unit of time; and detect, based on the counted result, the actual angular velocity of the rotating shaft of each of the motors M, in other words, the actual angular velocity of each of the linkages 4a to 4g.

The detecting circuit 22 is also operative to give the CPU 20 information indicative of the actual position and actual angular velocity of each of the linkages 4a to 4g.

The CPU 20 is operative to execute feedback control of the motion of each of the linkages (the joint portions) 4a to 4g in accordance with the robot motion program using the information sent from the detecting circuit 22.

Each of the drive circuits 21 is operative to supply, to each of the corresponding motors M, a drive current under control of the CPU 20 to rotatably drive the individual motors M corresponding to the individual linkages 4a to 4g. This controls the pose (position and orientation) of each of the linkages 4a to 4g in the three-dimensional coordinate system (robot coordinate system) to thereby adjust the pose (position and orientation) of a field of view (FOV) of the imaging device 5. Note that the FOV of the imaging device 5 represents a region that the imaging device 5 can view, and an image of the region can be picked up by the imaging device 5. The drive circuits 21 and the corresponding motors M also serve as regenerative braking means or reverse-torque braking means for braking corresponding linkages 4a to 4g.

Specifically, one drive circuit 21 is operative to switch the direction of current to be supplied to a corresponding motor M to allow the motor M to become a generator to thereby generate reverse torque to be applied in the direction opposite to the motor rotating direction. The reverse torque allows a corresponding one of the linkages 4a to 4g to be braked. Preferably, power generated by the motor M serving as the generator can be delivered to a power supply unit (not shown) of the controller 6 to be charged therein.

In the embodiment, note that the weight of each of the linkages 4a to 4g has been measured to be stored in, for example, the memory 23, and, as described above, the actual angular velocity of each of the linkages 4a to 4g is detected to be sent to the CPU 20.

As described above, the position and orientation of each of the linkages 4a to 4g in the robot coordinate system (X, Y, Z) depends on the motion of each of the linkages 4a to 4g.

Specifically, the robot controller 6 (the CPU 20) works to execute the check program stored in the memory 23 to control the drive circuits 21 based on the information indicative of the actual position and actual angular velocity of each of the linkages 4a to 4g.

This sequentially moves the imaging device 5 toward a plurality of target points (check points) in the check space SC taught by the teaching device TD.

In accordance with the check program, the robot controller 6 (CPU 20) drives the imaging device 5 located at each of the target points to pick up an image of a portion of a workpiece W located at the check position.

For example, at each of the target points, the imaging device 5 is designed to receive an optical image of the workpiece W through a lens system and to pick up the optical image received thereby.

Next, in accordance with the check program, the robot controller 6 processes the picked-up images to thereby check whether parts are assembled to respective proper positions of the workpiece W to be checked.

As described above, the target points (check points) for the robot 3 have been taught by the teaching device TD as pose data (position and attitude data) to be stored in the controller 6. When the pose data are taught by the teaching device TD to the controller 6, data indicative of no-entry zones in the robot coordinate space (check space CS) has also been taught by the teaching device TD to the controller 6.

In accordance with the check program, at each of the target points, the robot controller 6 automatically adjusts optical conditions of the imaging device 5, such as the size of the FOV associated with the focal length, the focus of the lens system, and an iris thereof.

However, during execution of no-entry zone establishing task, the optical conditions are configured to be fixed to respective constant conditions.

Note that each of the picked-up images is defined in a coordinate system of the imaging device 5. For this reason, the controller 6 is programmed to calibrate the picked-up images in the coordinate system of the imaging device 5 into corresponding picked-up images in the robot coordinate system. Thereafter, the controller 6 processes the picked-up images in the robot coordinate system.

Next, the structure of the teaching device TD designed to teach, to the controller 6, the pose data for each of the plurality of target points and the data indicative of the no-entry zones, will be described hereinafter.

Referring to FIG. 1, the teaching device TD is configured as a common personal computer system. Specifically, the teaching device TD consists of a computer 7 communicably connected to the controller 6, a display 8 electrically connected to the computer 7, and an input device ID including a keyboard 9 and a mouse 10.

The computer 7 is composed of a CPU 30, an Ethernet interface 31, a memory 32 including a volatile or nonvolatile ROM and RAM, and an image memory 33. Each of the Ethernet interface 31, memory 32, and image memory 33 are electrically connected to the CPU 30.

The ROM of the memory 32 has stored therein a teaching program and a non-entry zone establishing program. The RAM of the memory 32 works to temporarily store therein data processed by the CPU 30

The image memory 33 is operative to store therein the picked up images in data format sent from the robot controller 6 via the Ethernet interface 31.

The Ethernet interface 31 works to allow data input and output between the CPU 30 and the controller 6.

The CPU 30 works to display various types of information on a screen of the display 8 in visible format.

The input device ID allows an operator OM to enter various types of instructions to the CPU 30. Specifically, some instructions entered to the CPU 30 from the input device ID can remotely move the robot 3 via the CPU 30 and the controller 6. A handheld teaching pendant (not shown) can be connected to the CPU 30. When the teaching pendant is connected to the CPU 30, some instructions entered to the CPU 30 from the teaching pendant input and/or the input device ID can remotely move the robot 3 via the CPU 30 and the controller 6.

The CPU 30 works to execute the teaching program stored in the memory 32.

In the embodiment, the teaching program causes the CPU 30 to:

actually move the imaging device 5 of the robot 3 to the desired target positions instructed with the input device TD by the operator OM while bringing the imaging device 5 to a desired pose at each of the desired target positions in cooperation with the controller 6;

teach the controller 6 target command points of each of the linkages 4a to 4g of the robot 3 corresponding to the desired target positions and required to move the imaging device 5 through a trajectory determined by the desired target positions; and teach the controller 6 pose data of each of the linkages 4a to 4g at each of the target command positions required to bring the imaging device 5 to the desired pose at each of the desired target positions.

The pose data for each of the target points is stored in the robot controller 6.

In addition, the CPU 30 works to execute the no-entry zone establishing program stored in the memory 32 in response to operations of the input device ID by the operator OM to thereby carry out a no-entry zone establishing task described hereinafter. The no-entry zone establishing task establishes, as a no-entry zone, a space in which at least one obstacle, such as the workpiece W located at the check position in the robot working space CS occupies. This results that:

the controller 6 moves the imaging device 5 during the teaching task so as to prevent the robot 3 from entering the no-entry zone; and the controller 6 calculates a trajectory of movement of the imaging device 5 toward the target positions and from it so as to avoid the trajectory from entering the no-entry zone.

The no-entry zone establishing task of the computer 7 is carried out thereby in cooperation with the robot 3 (the imaging device 5) when a workpiece W is stationary located at the check position in the robot working space CS.

In the embodiment, the computer 7 is programmed to execute the no-entry zone establishing task as follows.

Specifically, the computer 7 controls, in cooperation with the controller 6, the pose of each of the linkages 4a to 4g so as to:

locate the imaging device 5 of the robot 3 to a first position in the robot working space CS; and direct the FOV of the imaging device 5 in a first orientation.

The first position and first orientation allow the workpiece W located at the check position to be within the FOV of the imaging device 5. The first position and first orientation are collectively referred to as "first pose" hereinafter. When the imaging device 5 is located at the first position and the FOV is directed in the first orientation, the computer 7 drives the imaging device 5 in cooperation with the controller 6 to pick up a first image.

Next, the computer 7 controls, in cooperation with the controller 6, the pose of each of the linkages 4a to 4g so as to:

locate the imaging device 5 of the robot 3 to a second position in the robot working space CS; and direct the FOV of the imaging device 5 in a second orientation.

The second position and second orientation allow the workpiece W located at the check position to be within the FOV of the imaging device 5. The second position and second orientation are collectively referred to as "second pose" hereinafter. The second pose is different from the first pose. When the imaging device 5 is located at the second position and the FOV is directed in the second orientation, the computer 7 drives the imaging device 5 in cooperation with the controller 6 to pick up a second image.

First pose data (the first position and first orientation in the robot coordinate system) is stored in the RAM of the memory 32, and similarly, second pose data (the second position and second orientation in the robot coordinate system) is stored in the RAM of the memory 32.

First and second image data based on first and second images are stored in the image memory 33.

Figure 3:
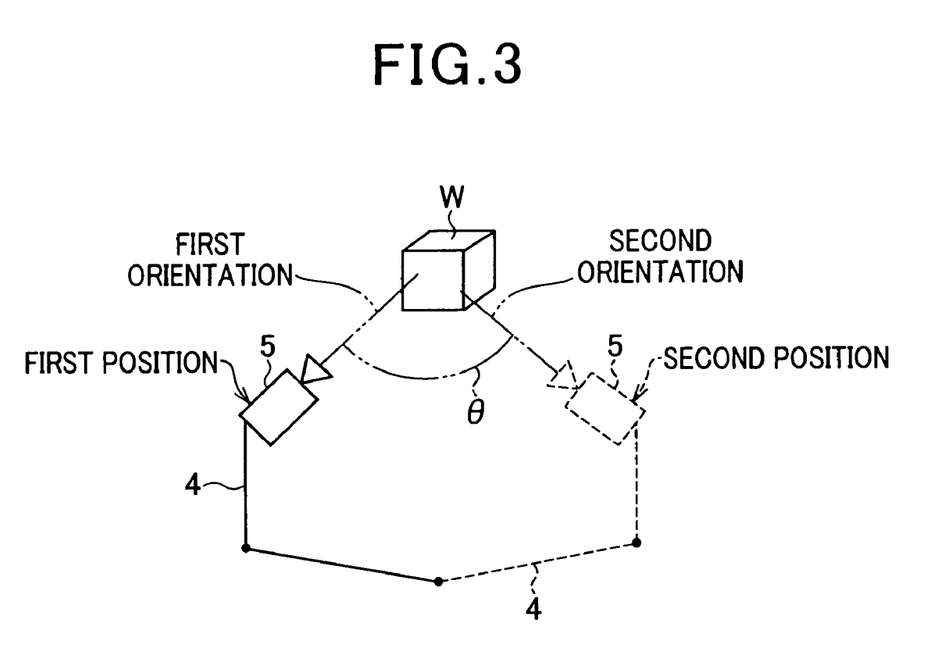
FIG. 3 is a diagram schematically illustrating a positional relationship between an imaging device and a workpiece in a first image pickup and that between the imaging device and the workpiece in a second image pickup according to the embodiment.

In the embodiment, as illustrated in FIG. 3, the first and second orientations are different from each other by an angle $\theta$ of, for example, 90 degrees or more.

Next, the computer 7 displays the first image on the screen of the display 8. At that time, the operator OM manipulates the input device ID to specify a first closed region (see "A1" in FIG. 4A) to enclose the imaged workpiece W on the first image. For example, the first closed region has a substantially elliptical shape including a circular shape.

Figure 4A:
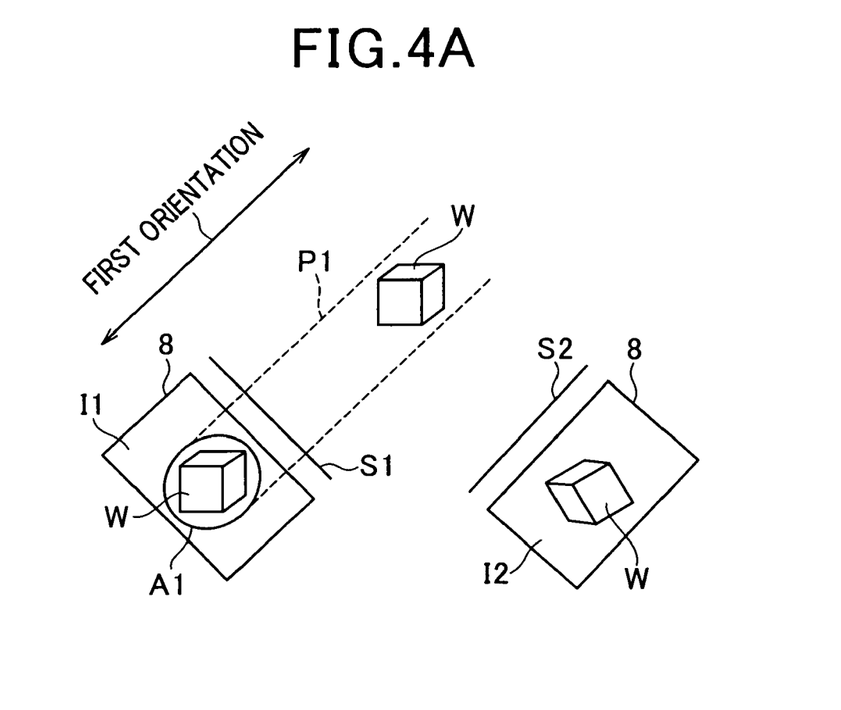
FIG. 4A is a view schematically illustrating a closed-region specifying process on a first image according to the embodiment.

The computer 7 virtually extends the first closed region in the first orientation to establish a first projection area in the robot working space CS (see "P1" in FIG. 4A). For example, the first projection area has a substantially cylindrical area extending in the first orientation.

Figure 4B:
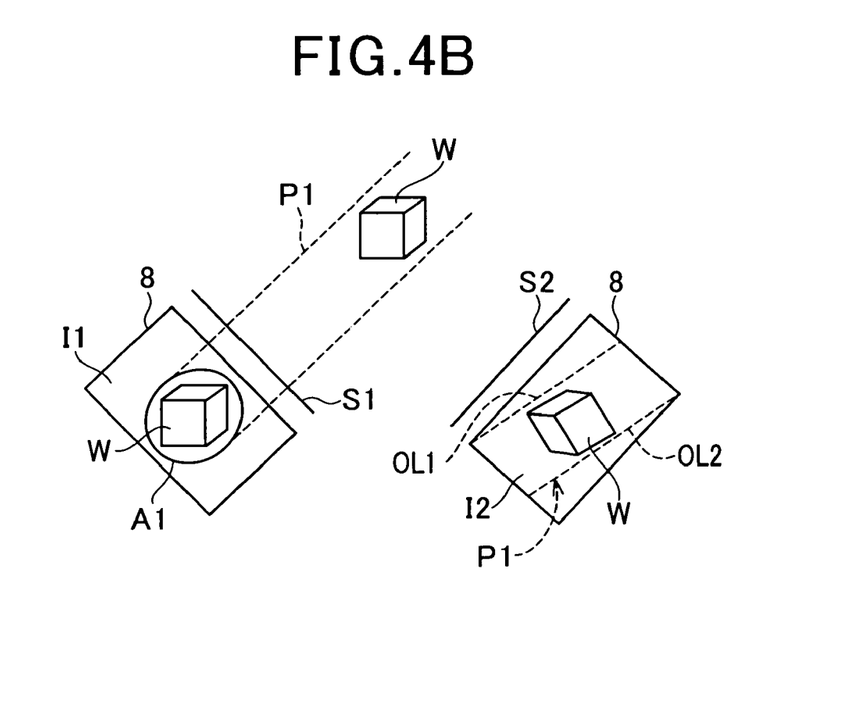
FIG. 4B is a view schematically illustrating a process of projecting a first-projection area on a second image according to the embodiment.

Subsequently, the computer 7 displays the second image on the screen of the display 8, and projects the first projection area on the second image such that the imaged workpiece W in the second image is within the first projection area.

At that time, the operator OM manipulates the input device ID to specify a pair of two lines (see "L1 and L2" in FIG. 4C) to clip a region of the first projection area; this region encloses the imaged workpiece W in the second image.

Figure 4C:
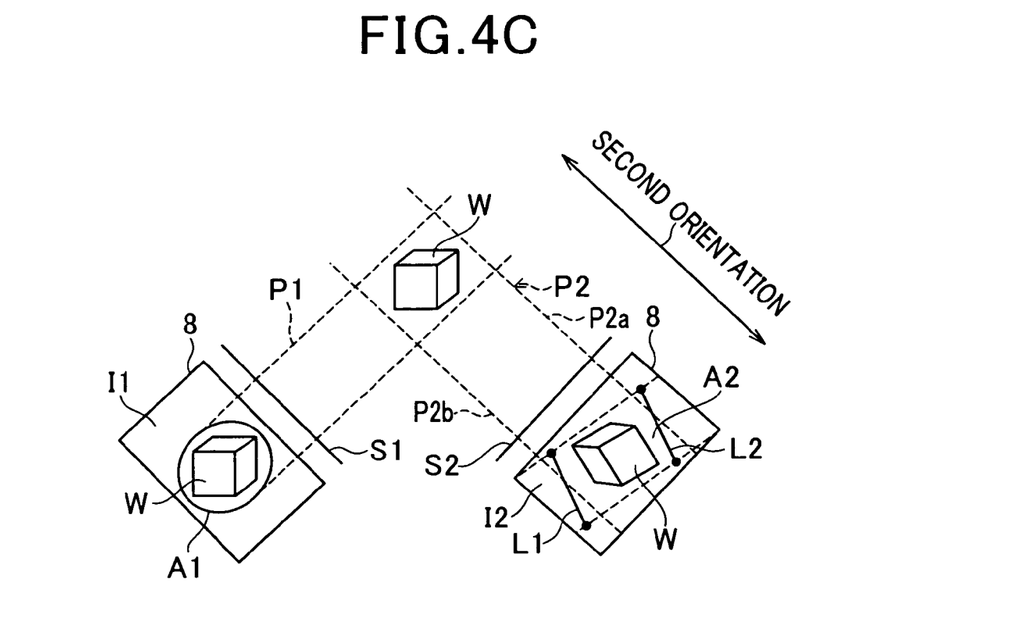
FIG. 4C is a view schematically illustrating a process of forming a second projection area on the second image according to the embodiment.

This results that a second closed rectangular region surrounded by the pair of two lines and outlines of the first projection area is defined (see "A2" in FIG. 4C).

Next, the computer 7 virtually extends the second closed region in the second orientation to establish a second projection area in the robot working space CS (see "P2" in FIG. 4C).

Figure 4D:
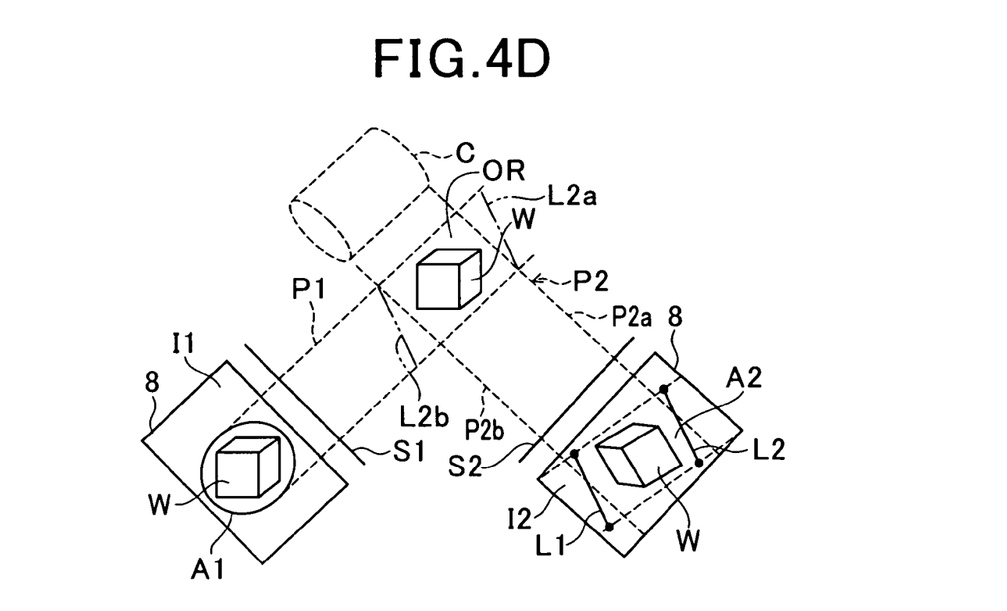
FIG. 4D is a view schematically illustrating a process of forming a no-entry zone between the first and second projection areas according to the embodiment.

Subsequently, the computer 7 calculates an overlap region between the first projection area and the second projection area in the robot working space, and establishes the overlap region as a no-entry zone (see "C" in FIG. 4D).

Next, the no-entry zone establishing task to be executed by the computer 7 in accordance with the no-entry zone establishing program will be described in detail hereinafter with reference to FIGS. 4A to 4D and FIG. 5.

When a workpiece W is located at the check position on the conveyer 2 in the robot working space, the operator OM manipulates the input device ID to instruct the computer 7 to run the no-entry zone establishing program stored in the memory 32.

Figure 5:
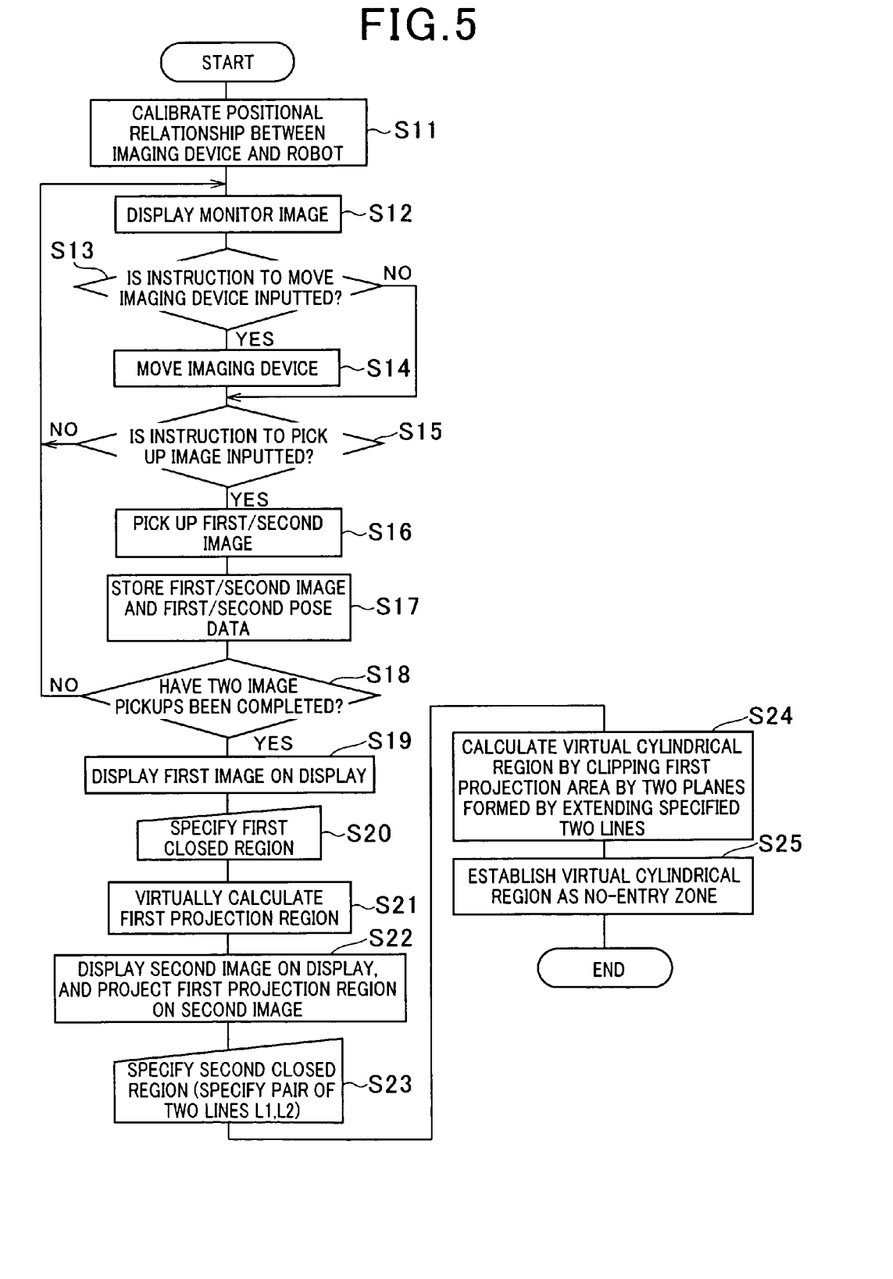
FIG. 5 is a flowchart schematically illustrating a no-entry zone establishing task to be executed by a computer illustrated in FIG. 1 according to the embodiment.

When launching the no-entry zone establishing program, the computer 7 calibrates a positional relationship (coordinate relationship) between the imaging device 5 and the robot 3 (articulated arm 4) in step S11 of FIG. 5.

Next, the computer 7 executes an image pickup routine in steps S12 to S16.

Specifically, in step S12, the computer 7 drives the imaging device 5 in cooperation with the controller 6 to pick up a monitor image. The computer 7 displays the picked-up monitor image on the display 8 in step S12.

Next, the computer 7 determines whether instructions (move instructions) to move the imaging device 5 are inputted thereto in step S13.

When no move instructions are inputted thereto, the computer 7 proceeds to step S15.

When the monitor image is displayed on the display 8, the operator OM manipulates the input device ID while looking at the monitor image displayed on the display 8 to enter the move instructions to the computer 7 (the determination in step S13 is YES). These move instructions cause the computer 7 to move the imaging device 5 toward the workpiece W in cooperation with the controller 6 in step S14.

Next, the computer 7 determines whether instructions (pickup instructions) to pick up an image with the imaging device 5 are inputted thereto in step S15.

When no pickup instructions are inputted thereto (the determination in step S15 is NO), the computer 7 determines that the actual position of the imaging device 5 does not allow the whole of the workpiece W to be not within the FOV of the imaging device 5. Then, the computer 7 returns to step S12 and repeats the processes in steps S12 to S15 until the determination in step S15 is YES.

At least one sequence of the processes S12 to S15 allows the whole of the workpiece W to be within the FOV of the imaging device 5 so that the workpiece W is displayed fully on the screen of the display 8.

Then, the operator OM manipulates the input device ID to enter the pickup instructions to the computer 7 (the determination in step S15 is YES).

At that time, the computer 7 grasps, as a first position, a current position of the imaging device 5 being located and, as a first orientation, a current orientation of the FOV of the imaging device. Subsequently, the computer 7 drives the imaging device 5 in cooperation with the controller 6 to pick up a first image I1 of the workpiece W.

Thereafter, the computer 7 stores in the image memory 33 first image data based on the first image I1, and stores in the memory 32 first pose data based on the grasped first position and first orientation in step S17.

Next, the computer 7 determines whether two image pickups have been completed in step S18.

At that time, because the first image has been completed, the determination in step S18 is NO, so the computer 7 returns to step S12 and executes processes in step S12 to S17 in order to pick up a second image.

Specifically, in step S12, the computer 7 drives the imaging device 5 in cooperation with the controller 6 to pick up a monitor image. The computer 7 displays the monitor image on the display 8 in step S12.

Next, the computer 7 determines whether move instructions are inputted thereto in step S13.

When no move instructions are inputted thereto, the computer 7 proceeds to step S15.

When the monitor image is displayed on the display 8, the operator OM manipulates the input device ID while looking at the monitor image displayed on the display 8 to enter the move instructions to the computer 7 (the determination in step S13 is YES). These move instructions cause the computer 7 to move the imaging device 5 toward the workpiece W in cooperation with the controller 6 such that the imaging device 5 is located to be different from the first position in step S14.

Next, the computer 7 determines whether instructions (pickup instructions) to pick up an image with the imaging device 5 are inputted thereto in step S15.

When no pickup instructions are inputted thereto (the determination in step S15 is NO), the computer 7 determines that the actual position of the imaging device 5 does not allow the whole of the workpiece W to be not within the FOV of the imaging device 5. Then, the computer 7 returns to step S12 and repeats the processes in steps S12 to S15 until the determination in step S15 is YES.

At least one sequence of the processes S12 to S15 allows the whole of the workpiece W to be within the FOV of the imaging device 5 so that the workpiece W is displayed fully on the screen of the display 8. Then, the operator OM manipulates the input device ID to enter the pickup instructions to the computer 7 (the determination in step S15 is YES).

At that time, the computer 7 grasps, as a second position, a current position of the imaging device 5 being located and, as a second orientation, a current orientation of the FOV of the imaging device. Subsequently, the computer 7 drives the imaging device 5 in cooperation with the controller 6 to pick up a second image I2 of the workpiece W.

Thereafter, the computer 7 stores in the image memory 33 second image data based on the second image I2, and stores in the memory 32 second pose data based on the grasped second position and second orientation in step S17.

Referring to FIG. 3, in the embodiment, the computer 7 preferably determines the first pose for the first image I1 and the second pose for the second image I2 such that the first and second orientations are different from each other by the angle θ within the range from 45 degrees to 90 degrees. More preferably, the angle θ is set at approximately 90 degrees.

This is because the computer 7 is programmed to determine a no-entry zone (a workpiece existence zone) based on stereoscopy.

In addition, the computer 7 preferably determines the first pose for the first image I1 and the second pose for the second image I2 such that a difference between the first position and the workpiece W and that between the second position and the workpiece W be substantially equal to each other.

Note that, in FIG. 3, the first image I1 is picked up in left oblique direction when viewing the workpiece W, and the second image I2 is picked up in right oblique direction such that the first and second orientations are different from each other by approximately 90 degrees.

In FIGS. 3 and 4A to 4D, the workpiece W is illustrated in the form of cube for the sake of simplicity.

After the second image I2 has been picked up, the determination in step S18 is YES, so the computer 7 proceeds to step S19.

In sequential steps S19 to S25, the computer 7 executes a closed-region specifying process, a calculating process, and an establishing process.

Specifically, in step S19, the computer 7 displays the first image I1 on the screen of the display 8 (see FIG. 4A).

At that time, the operator OM manipulates the input device ID to specify a first closed region A1 to enclose the imaged workpiece W on the first image I1. The computer 7 identifies the first closed region A1 on the first image I1 in step S20. The first closed region A1 has for instance a substantially elliptical shape including a circular shape.

In step S20, for example, the operator OM manipulates the input device ID to specify a center point, a major axis radius, and a minor axis radius for the first closed region A1 to enclose the imaged workpiece W on the first image I1. This allows the operator OM to easily specify the first closed region A1.

In step S21, the computer 7 virtually extends the first closed ellipsoidal region A1 in the first orientation to establish a first projection area P1 in the robot working space CS. For example, the first projection area P1 has a substantially cylindrical area extending in the first orientation.

Specifically, in step S21, the computer 7 extends, in the first orientation, the first closed ellipsoidal region A1 drawn on a first image plane S1 orthogonal to the first orientation and parallel to the imaging surface of the imaging device 5 being in the first pose. This allows the first projection area P1 having a substantially cylindrical shape to be easily calculated. It should be appreciated that the imaged workpiece W is fully enclosed in the first projection area P1.

In step S22, the computer 7 displays the second image I2 on the screen of the display 8, and projects the first projection area P1 on the second image I2 such that the imaged workpiece W in the second image I2 is within the first projection area P1.

In the embodiment, as illustrated in FIG. 4B, the first projection area P1 superimposed on the second image I2 is represented by two outlines OL1 and OL2, and the imaged workpiece W is contained in the two outlines OL1 and OL2.

At that time, the operator OM manipulates the input device ID to specify a second closed region A2 on the second image I2.

In the embodiment, for example, the operator OM specifies a pair of two lines L1 and L2 to clip a region of the first projection area; this region encloses the imaged workpiece W in the second image I2.

This results that the second closed region (rectangular region) A2 surrounded by the pair of two lines L1 and L2 and the outlines OL1 and OL2 of the first projection area P1 is defined (see FIG. 4C).

The computer 7 identifies the second closed region A2 on the second image I2 in step S23.

In step S23, for example, the operator OM manipulates the input device ID to specify a point of either end of each of the two lines L1 and L2. This allows the operator OM to easily specify the second closed region A2.

Next, in step S24, the computer 7 extends, in a direction substantially orthogonal to a second image surface S2, the specified lines L1 and L2 or the center points of them to calculate two planes P2a and P2b. In FIG. 4C, for instance, the center points of the specified lines L1 and L2 are extended as the two planes P2a and P2b. The second image surface S2 is orthogonal to the second orientation and parallel to the imaging surface of the imaging device 5 being in the second pose.

Subsequently, the computer 7 calculates, as a virtual cylindrical region C, an overlap region OR between the first projection area P1 and the second projection area P2 in the robot working space in step S24. In other words, the virtual cylindrical region C is formed by clipping the first projection area P1 by the two planes P2a and P2b.

The virtual cylindrical region C fully encloses the whole of the workpiece W, and has a volume greater than that of a space that the workpiece actually occupies.

Note that, when the specified lines L1 and L2 are extended as the two planes P2a and P2b (see L1a and L2a in FIG. 4D), a virtual cylindrical region having a substantially parallelogram in its axial cross section can be obtained.

In step S25, the computer 7 establishes an existence region of the virtual cylindrical region C as a no-entry region for the robot 3 in the robot working space. The data indicative of the no-entry region C in the robot working space CS is sent to the controller 6 to be stored therein. Thereafter, the computer 7 terminates the no-entry zone establishing task.

If a plurality of obstacles, such as jigs for holding the workpiece W or the like, or another tool, another machine, or the like, are located in the robot working space CS, the processes in step S11 to S25 are executed for each of the obstacles.

After the no-entry zone establishing task has been completed, the computer 7 runs the teaching program to execute the teaching task set forth above.

During execution of the teaching task, the controller 6 moves the imaging device 5 during the teaching task so as to prevent the robot 3 from entering the no-entry zone C. This makes it possible to prevent the imaging device 5 and the articulated arm 4 from interfering (contacting) with the workpiece W.

In addition, during execution of a checking task, the controller 6 calculates a trajectory of movement of the imaging device 5 toward the target positions and from it so as to avoid the trajectory from entering the no-entry zone C. This also makes it possible to prevent the imaging device 5 and the articulated arm 4 from interfering (contacting) with the workpiece W during execution of the checking task.

As described above, the visual robot test system 100 is configured to execute stereoscopic three-dimensional measurement using the first and second images I1 and I2 imaging the whole of the workpiece W in different directions to thereby determine a space that the workpiece W occupies in the robot working space CS as the no-entry zone.

In particular, in the embodiment, the computer 7 of the system 100 is programmed to determine the no-entry zone by calculating the vertical cylindrical region (overlap region) C based on the first and second projection spaces P1 and P2 without detecting some vertexes and/or some edges of a three-dimensional shape of the workpiece W.

Thus, it is possible to reduce imaging processes required to establish the no-entry zone as compared with the conventional method disclosed in the Japanese Patent Publication No. 3343682.

The no-entry zone establishing method requires for the operator OM merely specification of the first closed region A1 on the first image I1 and that of the lines L1 and L2 on the second image I2. This makes it possible to reduce burden on the operator OM as compared with the conventional method disclosed in the Japanese Patent Publication No. 3343682.

In addition, when specifying the first closed region A1 and the lines L1 and L2, the operator OM has little influence on whether the workpiece W has a complicated shape or a simple shape and on when some vertexes and/or some edges of the workpiece W disappears depending on the image picking-up directions.

In particular, in the embodiment, the no-entry zone establishing method requires for the operator OM merely specification of the first closed region A1 on the first image I1 and that of the lines L1 and L2 for the second closed region A2 on the second image I2. This makes it possible to more easily specify the second closed region A2, and more easily calculate the overlap region C between the first and second projection spaces P1 and P2.

In addition, in the embodiment, the computer 7 and the controller 6 are programmed to remotely move the imaging device 5 attached to the robot 3 (articulated arm 4) for checking the workpiece W to pick up the first and second images I1 and I2 different from each other. This can use the existing robot 3 and the existing imaging device 5 without providing additional imaging device and imaging-device moving robot, making it possible to maintain the simplified structure of the visual robot test system 100.

In the embodiment, the imaging device 5 attached to free end of the articulated arm 4 is used as means to pick up the first and second images, but at least one additional imaging device independently of the robot can be used.

In this case, the at least one additional imaging device can be movably or fixedly provided to pick up images of the workpiece W. In this case, the computer 7 can calibrate a positional relationship (coordinate relationship) between the additional at least one imaging device and the robot 3 (articulated arm 4); this allows execution of the no-entry zone establishing task as well as the embodiment.

In the embodiment, the two lines L1 and L2 are specified on the second image I2 so as to specify the second closed region A2, but the present invention is not limited to the structure. Specifically, like the first closed region A1, an ellipsoidal closed region can be specified as the second closed region A2. In this case, as well as the first projection area P1, the second closed ellipsoidal region is extended in the second orientation to establish a substantially cylindrical second projection area P2 in the robot working space CS. Thereafter, an overlap region between the first and second projection areas P1 and P2 is calculated as the no-entry zone.

The first closed region to be specified by the operator OM can have a substantially rectangular or square shape. In this case, the operator OM can specify four apexes on the screen, or a center point and one apex to thereby specify the first closed region. Even if the first closed region has a rectangular or square shape, it is possible to easily calculate the first projection area and the overlap region between the first and second projection spaces.

In the embodiment, the computer system as the teaching device TD is communicably coupled to the controller 6, and the no-entry zone establishing task is configured to be executed by the computer 7 of the computer system, but the present invention is not limited to the structure.

Specifically, the computer system can serve as merely peripheral devices for the controller 6. In addition, in place of the computer system, a teaching pendant with a display can be used. Moreover, in place of the computer system, a teaching pendant designed to manually move the robot 3 under control of the controller 6 can be used.

In the embodiment, the first and second images obtained by picking up in different directions are used to establish the no-entry zone, but three or more images obtained by picking up in different directions can be used to establish the no-entry zone. This allows the no-entry zone to be determined in more detail.

The present invention can be applied to various robot systems, such as an assembly robot system or a coating robot system.

The present invention can be applied to various shapes and structures of robots without limiting such a vertical articulated robot.

While there has been described what is at present considered to be the embodiment and its modifications of the present invention, it will be understood that various modifications which are not described yet may be made therein, and it is intended to cover in the appended claims all such modifications as fall within the true spirit and scope of the invention.

What is claimed is:

1. A system for establishing, in a three-dimensional working space for a robot, a space which an obstacle occupies as a no-entry zone for the robot, the system comprising:
an image pickup unit configured to:
pick up a first image of the obstacle from a first viewpoint with a first orientation with respect to the obstacle while a whole of the obstacle is within a predetermined first field of view, and
pick up a second image of the obstacle from a second viewpoint with a second orientation with respect to the obstacle while the whole of the obstacle is within a predetermined second field of view, the second viewpoint and second orientation being different from the first viewpoint and first orientation, respectively;
a display unit configured to display the picked-up first and second images on a screen thereof;
a first closed region specifying unit configured to receive a first closed region specified by an operator on the screen, the first closed region enclosing an imaged obstacle in the first image;
a first projection area determining unit configured to determine a first virtual projection area by extending the first closed region in the first orientation;
a second closed region specifying unit configured to receive a second closed region specified by an operator on the screen, the second closed region enclosing the imaged obstacle in the second image;

a second projection area determining unit configured to determine a second virtual projection area by extending the second closed region in the second orientation; and an establishing unit configured to establish an overlap region between the first and second projection areas as the no-entry zone for the robot.

2. A system according to claim 1, wherein the robot comprises a free end, and an imaging device attached thereto and having a predetermined field of view, the image pick up unit comprises:

the imaging device, the field of view of the imaging device being commonly used as the first and second field of views of the image pickup unit; and a remote manipulating unit configured to:
remotely manipulate the robot to locate the imaging device at the first viewpoint such that the field of view of the imaging device is directed toward the obstacle whereby the whole of the obstacle is within the field of view thereof, remotely drive the imaging device to pick up the first image of the obstacle, after the first image has been picked up, remotely manipulate the robot to locate the imaging device at the second viewpoint such that the field of view of the imaging device is directed toward the obstacle whereby the whole of the obstacle is within the field of view thereof, and remotely drive the imaging device to pick up the second image of the obstacle.

3. A system according to claim 1, wherein, on the screen of the display on which the second image is displayed, the first projection area is displayed, and the second closed region specifying unit is configured to:

receive two lines specified by an operator on the first projection area to clip a region of the first projection area, the region of the first projection area enclosing the imaged workpiece; and determine, as the second closed area, a region surrounded by the two lines and an outline of the first projection area.

4. A system according to claim 1, wherein at least one of the first and second closed areas has any one of a substantially ellipsoidal shape and a substantially rectangular shape.

5. A method of establishing, in a three-dimensional working space for a robot, a space which an obstacle occupies as a no-entry zone for the robot, the method comprising:

picking up a first image of the obstacle from a first viewpoint with a first orientation with respect to the obstacle while a whole of the obstacle is within a predetermined first field of view, and picking up a second image of the obstacle from a second viewpoint with a second orientation with respect to the obstacle while the whole of the obstacle is within a predetermined second field of view, the second viewpoint and second orientation being different from the first viewpoint and first orientation, respectively;

displaying the picked-up first and second images on a screen of a display;

specifying a first closed region on the screen, the first closed region enclosing an imaged obstacle in the first image;

determining a first virtual projection area by extending the first closed region in the first orientation;

specifying a second closed region on the screen, the second closed region enclosing the imaged obstacle in the second image;

determining a second virtual projection area by extending the second closed region in the second orientation; and establishing an overlap region between the first and second projection areas as the no-entry zone for the robot.

6. A method according to claim 5, wherein the robot comprises a free end, and an imaging device attached thereto and having a predetermined field of view, the image pick up step is configured to:

remotely manipulate the robot to locate the imaging device at the first viewpoint such that the field of view of the imaging device as the first field of view is directed toward the obstacle whereby the obstacle is within the field of view thereof;

remotely drive the imaging device to pick up the first image of the obstacle, remotely manipulate the robot to locate the imaging device at the second viewpoint such that the field of view of the imaging device as the second field of view is directed toward the obstacle after the first image has been picked up whereby the obstacle is within the field of view thereof; and remotely drive the imaging device to pick up the second image of the obstacle.

7. A method according to claim 5, wherein, on the screen of the display on which the second image is displayed, the first projection area is displayed, and the second closed region specifying step is configured to:

specify two lines on the first projection area to clip a region of the first projection area, the region of the first projection area enclosing the imaged workpiece; and determine, as the second closed area, a region surrounded by the two lines and an outline of the first projection area.

8. A method according to claim 5, wherein at least one of the first and second closed areas has any one of a substantially ellipsoidal shape and a substantially rectangular shape.

* * * * *